United States Patent [19]

Martin

[11] 3,712,649
[45] Jan. 23, 1973

[54] APPARATUS FOR SUPPORTING AND RETAINING LOW DENSITY WEBS

[76] Inventor: Duane Paul Martin, 7301 James Avenue South, Minneapolis, Minn. 55402

[22] Filed: Oct. 11, 1965

[21] Appl. No.: 494,561

[52] U.S. Cl. ............... 285/397, 285/257, 285/417, 285/424, 29/432, 29/513
[51] Int. Cl. ............................................. F16l 53/00
[58] Field of Search....285/23, 66, 71, 257, 424, 397, 285/319; 29/432, 513, 157; 24/81 B, 81 BF

[56] References Cited

UNITED STATES PATENTS

| | | | |
|---|---|---|---|
| 2,229,535 | 1/1941 | Weber et al. | 287/189.35 X |
| 1,083,269 | 1/1914 | Bradnack | 285/257 |
| 1,357,820 | 11/1920 | Peirce | 285/257 |
| 2,917,083 | 12/1959 | Duvall et al. | 285/397 X |
| 3,001,805 | 9/1961 | Jones et al. | 285/397 |
| 3,297,285 | 1/1967 | Simmons | 24/81 X |
| 3,347,569 | 10/1967 | Lindgren | 285/257 X |

Primary Examiner—Thomas F. Callaghan
Assistant Examiner—Wayne L. Shedd
Attorney—Williamson, Palmatier and Bains

[57] ABSTRACT

A duct connector for joining a pair of low density web duct sections together in end to end abutting relation comprising a sleeve telescopically insertable in snug fitting relation within the ends of the abutting duct sections. A plurality of similar clips affixed to the sleeve and extending outwardly therefrom engaging the abutting ends of the duct sections. The clips being bent into engaging relation with the outer surface of the duct sections. Each clip having a terminal portion which is disposed in penetrating relation with respect to the duct sections to interlock the latter together.

1 Claim, 8 Drawing Figures

PATENTED JAN 23 1973

3,712,649

INVENTOR
DUANE P. MARTIN
BY HIS ATTORNEYS
Williamson & Palmatier

APPARATUS FOR SUPPORTING AND RETAINING LOW DENSITY WEBS

Although low density material such as fiber glass has been available and used for several years as ducts in heating, ventilating and air conditioning installations, a suitable method and apparatus for joining duct sections has not been available. Fiber glass duct sections are presently joined by inserting an inner sleeve of formed sheet metal into each end of the sections to be joined. A transverse outside flange midway in the sleeve is adapted to engage the transverse edge of the sections to be joined. The fiber glass duct sections and sheet metal sleeve must then be joined on both sides of the sleeve flange to secure the connection. This is done by drilling through the duct web and sleeve at suitable intervals, and assembling a sheet metal screw and washer at each of these intervals. This method is time consuming, and uses apparatus at the joint which is not only unduly complicated and difficult to operate and assemble, resulting in a relatively expensive connection.

With these comments in mind, it is to the elimination of these and other disadvantages to which the present invention is directed, along with the inclusion therein of other novel and desirable features.

An object of my invention is to provide a new and improved method and apparatus for joining fiber glass duct sections of simple and inexpensive construction and operation.

Another object of my invention is to provide a new and improved duct retaining and supporting clip which does not require the use of tools.

Another object of my invention is to provide a new and improved method and apparatus for joining duct sections, eliminating the need for screws, washers, nuts and sleeve flanges.

These and other objects and advantages of my invention will more fully appear from the following description made in connection with the accompanying drawings wherein like reference characters refer to the same or similar parts throughout the several views, and in which.

Figure 1:
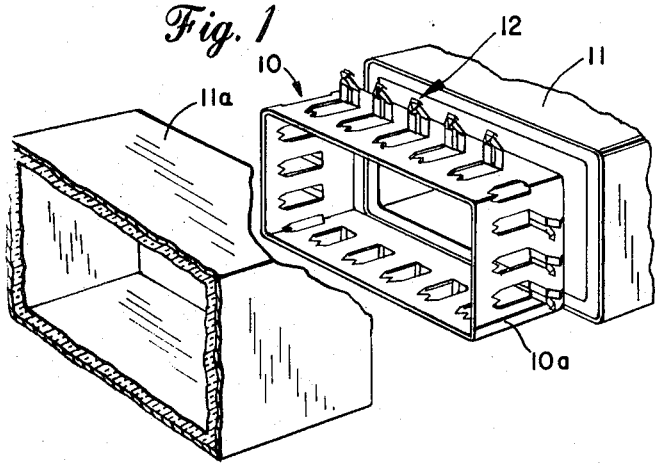
FIG. 1 is a perspective view showing a typical joint using my integral clip and sleeve assembly.
Figure 2:
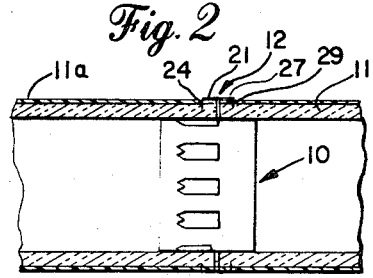
FIG. 2 is a longitudinal section view through a duct joint showing the sleeve and clip in position forming a connection between duct sections.

One form of the present invention is shown in the drawings and is described herein. The sleeve of my invention is shown in FIG. 1, and is indicated in general by numeral 10. The sleeve is formed from coil material and joined at joint 10a. Fiber glass duct sections 11 and 11a are shown in position to receive the sleeve for mounting thereto. Duct material is typically 1 inch thick fiber glass material having an aluminum fabric outer covering bonded to the web. Sleeve material may be 24 gauge sheet metal which is flexible yet bendable into a predetermined form. Integral retaining clips, indicated in general by numeral 12, are shown in position to receive and secure duct sections 11 and 11a. Referring to FIG. 2, duct sections 11 and 11a are shown in secure position with sleeve 10 at the inside of the joint of the abutting sections of duct 11 and 11a respectively, and clip 12 folded into the secure position.

Figure 3:
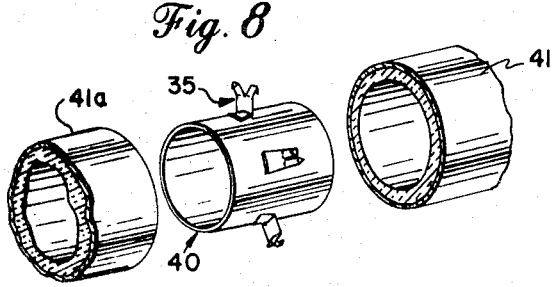
FIG. 3 is an enlarged plan view of a portion of the sleeve showing the integral retaining and supporting clip prior to forming.

The details of the clip assembly 12 is best shown by referring to FIG. 3. Clip 12 is shown in position on a portion of sleeve 10 as it would be prior to being formed from sleeve 10 into separate clip sides 12a and 12b to receive ducts 11 and 11a. Clip side piece 12a is defined by fold line 13 at the base thereof, side cut lines 14 and 15 and front cut lines 16 and 17 extending from side cut lines 14 and 15 respectively, and converging to form a duct engaging portion. Clip side piece 12b is defined by base fold line 18, side cut lines 15 and 19 and converging cut lines 20 and 20a which extend from cut lines 15 and 19 respectively forming a duct engaging portion.

Clip side 12a secures duct 11a and includes a supporting portion 21 and a flange portion 22 which prevents further inward movement of duct 11a toward the joint. Fold line 23 provides for easy folding of supporting portion 21 into contact with the duct 11a. Duct engaging portion 24 is folded at fold line 25 to engage and pierce duct 11a. Similarly, clip side 12b includes a flange portion 26 and a supporting portion 27 folded along fold line 28. Duct engaging portion 29 folds along fold line 30 engaging and piercing duct 11. Flange portions 22 and 26 of each clip form an outwardly extending clip body.

Figure 4:
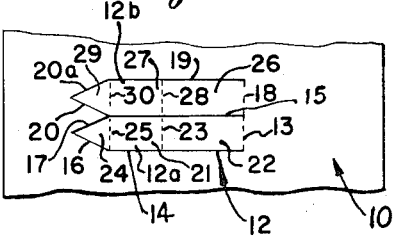
FIG. 4 is a perspective view with a partial break-away view showing a modified form of my invention adapted to hang the duct system utilizing the sleeve and clip assembly.
Figure 5:
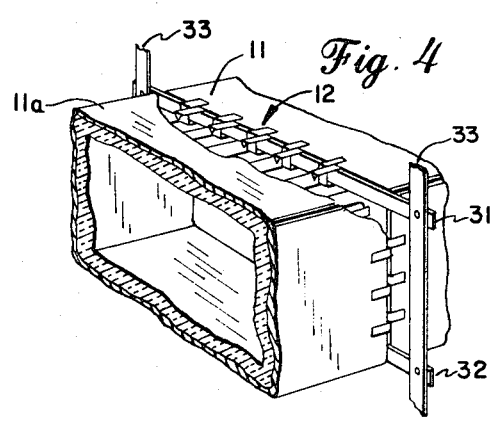
FIG. 5 is an enlarged plan view of the configuration of the modified integral clip and sleeve sheet material.

A modified form of my invention is shown in FIG. 4. In this form, clip assemblies 12 are used to support the duct work. An upper transverse hanging member or strap 31 is shown at the joint of duct sections 11 and 11a respectively. Strap 31 is woven between top flange portions 22 and 26, allowing supporting portions 21 and 27 to rest on upper strap 31 thereby supporting ducts section 11 and 11a. Lower transverse strap 32 is fitted between lower clip assembly flange portions 22 and 26 respectively and additionally supports the joint by contacting sleeve 10 preventing bowing of the duct in larger sizes. This detail is readily seen in FIG. 5. Upright members or straps 33 are connected to straps 31 and 32 and to a suitable building support, completely suspending the duct as desired. FIG. 5 shows clips 12a and 12b slightly off-set at their base lines. Base line 13 is not co-extensive with base line 18, but is spaced apart somewhat to allow straps 31 on the top or 32 on the bottom to pass between side clip pieces 12a and 12b at the flange portions 22 and 26. Therefore the flanges 22 and 26, which comprise each clip body in this embodiment, are not disposed in coplanar relation with respect to each other. The spacing, denoted by dimension (x), facilitates fitting straps 31 or 32 between the flange portions 22 and 26. Straps 31 and 32 are typically steel approximately one-sixteenth inch thick and 1 inch wide.

Figure 6:
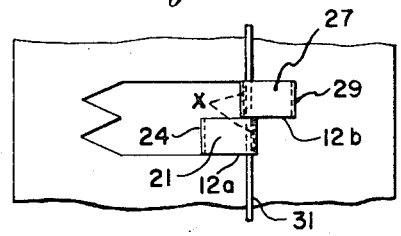
FIG. 6 is a diagrammatic view showing a coil of sleeve material prior to folding into a sleeve for a duct joint and prior to forming the retaining and supporting clip.

Sleeve 10 is formed from a coil, as shown in FIG. 6, the coil is typically 24 gauge sheet metal, and is usually galvanized. This sheet metal gauge is suitable for coiling and is flexible enough to allow bending, yet is rigid enough to maintain its shape after the bending operations have been performed. The coil, indicated in general by numeral 34 in FIG. 6, includes clip assemblies 12 which are cut and scored for later forming into clips to secure duct sections. Clips 12 are spaced at approximately 6 inch centers along the length of the coil which is approximately 5 to 7 inches wide for most installations. The clip 12 is approximately 3 inches long with two legs, each three-fourth inch wide. The coil is unwound and cut at the desired length and then folded to form duct 10 of the desired length and width. The joint 10a may be made with sheet metal screws or by soldering, welding or any of several well known methods.

Figure 7:
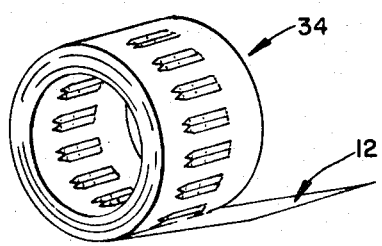
FIG. 7 is a perspective view showing an additional modified form of my invention as it would appear singly for attachment to standard duct sleeves.

An additional modified form of my invention is shown in FIG. 7. A single clip 35 is shown having a base 36 which may be attached to a standard duct connection sleeve. The base 36 may be mounted to the sleeve with sheet metal screws through hole 36a or may be soldered or welded at suitable intervals. Extending upwardly from base 36 is flange portion or clip body 37 which prevents inward longitudinal movement of the duct sections. Supporting portions 38 and 38a are folded in opposite directions into face contact with the outer surface of the duct sections to be connected. Duct engaging portions 39 and 39a engage the duct sections and secure the duct from further longitudinal movement.

Figure 8:
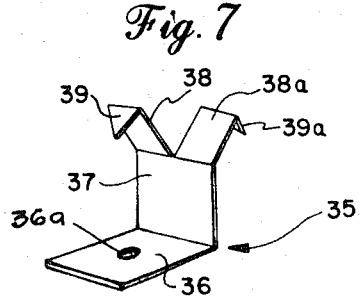
FIG. 8 is a perspective view showing the modified clip of my invention as would appear attached to a sleeve and joining a circular duct.

As shown in FIG. 8, clip 35 is secured to a standard circular duct sleeve, indicated in general by numeral 40, which is shown in position to receive circular duct sections 41 and 41a. This same clip construction may, of course, be mounted on a rectangular or square duct sleeves as well as on various other sheet metal members disposed in the duct. For example, the clip may be attached to the directional members in a duct for effecting a joint and also attached to transition sleeves to secure a joint.

It is obvious that the integral clip and sleeve assembly may be formed from coil 34 into a circular sleeve as well as square or rectangular sleeves.

In operation my invention is utilized to support and retain low density web ducts suitable to carry forced air in a heating, ventilating and air conditioning system. The joints must be substantially air tight and must have sufficient strength to maintain the rectangular, square or circular configuration of the duct work. A sleeve is formed from coil 34 into the same configuration as the configuration of the duct sections to be joined, and with the same dimensions as the inside dimensions of the duct sections. Sufficient prescored and precut material is unwound and cut from coil 34 and is then bent at transverse predetermined intervals to form the sleeve which is secured end to end by suitable securing means.

Next, clip assemblies 12 are folded outwardly from sleeve 10 along base fold lines 13 and 18. Clips 12 are folded outwardly to a substantially upright position allowing sleeve 10 to be fitted into duct sections 11 and 11a locating the transverse edge of sections 11 and 11a to come in face contact with the flange portions 22 and 26 of clips 12a and 12b. The duct engaging portions 24 and 29 are folded downwardly along fold lines 25 and 30 and, simultaneously supporting portions 21 and 27 are folded along fold lines 23 and 28 in opposite directions, forming the supporting portions of clips 12a and 12b respectively. Supporting portion 21 contacts the outer surface of duct 11a and retains the duct against sleeve 10. Supporting portion 27 contacts duct 11 and retains it inwardly against sleeve 10. Web engaging portions 24 and 29, folded into position, pierce the outer surface of duct 11a and 11 respectively, retaining the duct work to sleeve 10.

The joint formed using the apparatus and method of my invention is sufficiently strong to withstand the longitudinal and transverse stresses experienced in the duct during hanging and in operation. Shifting and warping of the duct is prevented by the positive contact of the clip to the duct retaining the duct against the sleeve. Further, since the clips are spaced along the sleeve at close intervals, the sleeve conforms very closely to the inside of the duct. This prevents heat loss or cooling loss in that much air turbulence at the point of connection is eliminated because of the lack of protruberances in the air streams at the joint. Turbulence is further decrease in that sheet metal screws do not project into the air stream.

In many installations, the joint is taped after completion. This eliminates air loss through the joint and gives some additional strength. The device of my invention allows a better taped joint since the supporting portion of the clip contacts the duct leaving a minimum surface to cover. When using sheet metal screws, however, the tape must cover both the washer and the head of the screw, resulting in a less effective taped joint.

Although the apparatus of my invention may be packaged in either the single clip form for subsequent attachment to a sleeve, or in a preformed sleeve with attached clip, it is anticipated that my apparatus will be most readily accepted in the coil form. The coil with the integral clips allows a user to maintain one inventory which can be used for all size ducts. Further, the material is shipped and stored with a minimum of wasted space. All of the above mentioned forms, of course, readily receive transverse hanging members to provide for quick suspension of the duct system.

The apparatus of my invention may also be packaged in sheet form, and it is anticipated that since the low density web is presently shipped in 10 foot lengths that the sleeve material of my invention may also be shipped in 10 foot lengths in either 5 or 7 inch widths. The sleeve formed from either the sheet or coils may be readily used at the starting point of a duct originating from either a plenum or a main line. The sleeve is simply inserted in the opening formed in the main duct or plenum and attached thereto by any of several known methods. The clips are then formed, some of which pierce the main duct or plenum, others of which fold over and engage the lateral duct. Further, sleeves may be fabricated from the sheet or coil form to effect angle turns in duct systems such as a 90° turn which necessitates a joint at 45° of the duct system. Transition sections may also be formed from the coil or sheet sleeves reducing large ducts down to smaller ducts. The angle turns and the transition sections may also be made by simply attaching the single clip form of my invention to the prefabricated sections to effect the desired joint.

Although I have shown the clips of my invention integral with the sheet material, and facing the same direction, it is obvious that the clips may be spaced other than side by side and may be spaced and disposed in opposite directions without departing from the scope of my invention. It is also obvious that the retaining clips of my invention may be incorporated into presently available coils of material for use in duct systems for controlling the flow of air as well as directing the flow of air. The expression "fixedly connected" when used to describe the relation of the clips with respect to the associated sleeve is intended to broadly cover clips which are integral with the associated sleeve (formed from the same blank of material) as well as clips which are attached to the associated sleeve sheet material, screws, soldering, welding or the like.

It will, of course, be understood that other various changes may be made in the form, details, arrangement and proportions of the various parts without departing from the scope of my invention.

What is claimed is:

1. A duct connector for joining together in end to end abutting relation fiberglass duct sections of large cross sectional size and of the type used in heating an air conditioning systems, comprising a metal sleeve dimensioned and shaped for telescopic insertion in snug fitting relation within abutting duct sections, a plurality of similar clip assemblies integral with said sleeve and being spaced apart from each other circumferentially of the duct, each clip assembly including a pair of elongate side-by-side clips defined by a elongate cuts extending in the same direction from a common transverse plane longitudinally of the sleeve, one of the elongate cuts defining the adjacent longitudinal edges of the pair of clips of a clip assembly, each clip including a flange portion extending from the sleeve and having opposite surfaces thereof positioned directly against the edges of the duct section, each clip including a support portion extending at substantially right angles to the flange portion, the support portion of one clip of each clip assembly engaging the exterior surface of one duct section and the support portion of the other clip of each clip assembly engaging the exterior surface of the other duct section, each clip including a pointed duct engaging portion bent at substantially right angles to the support portion and penetrating a duct section each said elongate cut between each pair of clips of each clip assembly extending from the flange engaging portion to the duct engaging portions of said assembly.

* * * * *